No. 790,746. PATENTED MAY 23, 1905.
A. A. PEARCE & J. N. BEAVER.
PLOW.
APPLICATION FILED MAY 14, 1904.
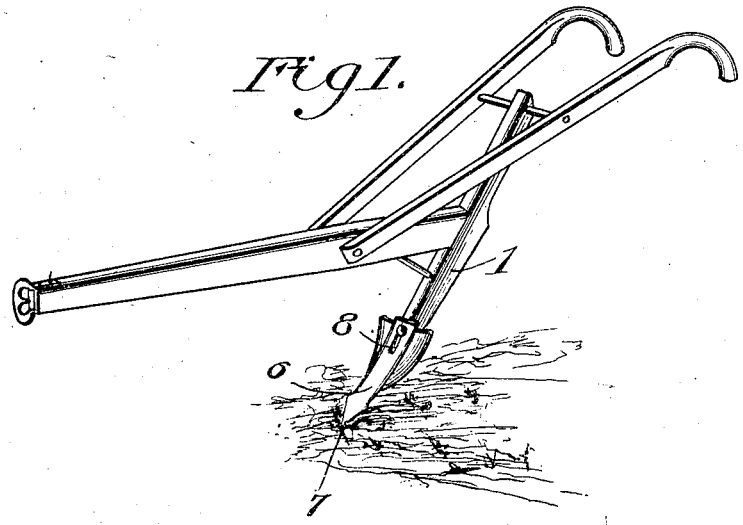
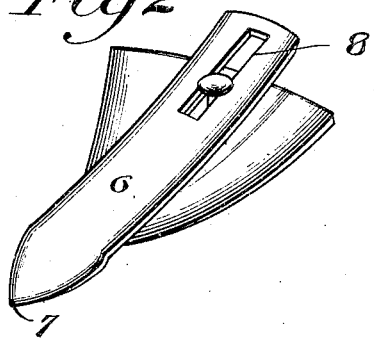
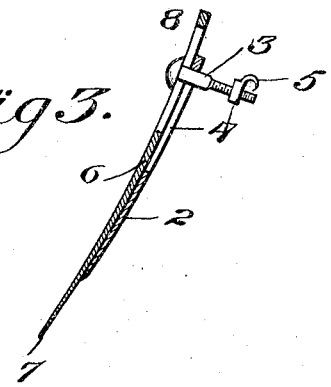
Inventors
Aaron Amos Pearce.
Joseph Newton Beaver.
Witnesses
Phil E. Barnis.
Herbert D. Lawson.
By Victor J. Evans
Attorney No. 790,746. Patented May 23, 1905.

UNITED STATES PATENT OFFICE.

AARON AMOS PEARCE AND JOSEPH NEWTON BEAVER, OF GILLHAM, ARKANSAS.

PLOW.

SPECIFICATION forming part of Letters Patent No. 790,746, dated May 23, 1905.

Application filed May 14, 1904. Serial No. 208,003.

*To all whom it may concern:*

Be it known that we, AARON AMOS PEARCE and JOSEPH NEWTON BEAVER, citizens of the United States, residing at Gillham, in the county of Sevier and State of Arkansas, have invented new and useful Improvements in Plows, of which the following is a specification.

Our invention relates to new and useful improvements in plows; and its object is to provide an attachment whereby the life of the plow may be prolonged.

A further object is to provide an attachment of this character which can be attached to any form of plow and which is of inexpensive and durable construction and which can be readily placed in position.

The invention consists of a tongue having a pointed end and a longitudinally-extending slot, said slot being adapted to receive a bolt which extends through the plow and its stock.

The invention also consists of the further novel construction and combination of parts hereinafter more fully described and claimed, and illustrated in the accompanying drawings, showing the preferred form of our invention, and in which—

Figure 1 is a perspective view of a plow having our improved attachment secured thereon. Fig. 2 is a perspective view of the shovel of the plow detached, said shovel being shown provided with our improved attachment; and Fig. 3 is a central longitudinal section through the attachment and shovel.

Referring to the figures by numerals of reference, 1 is the stock of a plow having a shovel 2 of any suitable construction connected thereto, and this shovel is adjustably connected to the stock by means of a bolt 3, which is arranged within a longitudinally-extending slot 4 in the shovel. A nut 5 is located upon the bolt and is adapted to clamp the shovel upon the stock. Adjustably and centrally mounted upon and in contact with the shovel is an attachment in the form of a tongue 6, having a pointed end 7, which forms the working edge of the plow, and this strip has a longitudinally-extending slot 8 adapted to receive the bolt 3. The upper end of the tongue 6 extends some distance above the upper edge of the shovel, and by means of the elongated slot 8 therein said tongue is permitted to have an adjustment to permit of a longer or shorter cutting-point for the purpose of entering the soil to a required depth. This attachment can be readily placed upon any form of plow, and it is obvious that by employing it the life of the plow may be greatly prolonged. As the point 7 wears away strip 6 can be moved longitudinally, so as to project the same farther from the end of the shovel. Old plows can be reused by attaching this device, and considerable expense may thus be obviated.

It will be especially noted that in this device the bolt 3 serves as a common means for attaching the shovel to the stock and the blade 6 to the shovel, and, furthermore, that the blade and shovel may be moved in reverse directions longitudinally, thereby obtaining a wider range of adjustment of the parts.

In the foregoing description we have shown the preferred form of our invention; but we do not limit ourselves thereto, as we are aware that modifications may be made therein without departing from the spirit or sacrificing any of the advantages thereof, and we therefore reserve the right to make such changes as fairly fall within the scope of our invention.

Having thus described the invention, what is claimed as new is—

A plow comprising a stock having a longitudinally-slotted shovel mounted thereon, a pointed tongue constructed of a narrow strip of metal mounted centrally on and in contact with the shovel so that the shovel will extend on opposite sides of the tongue, the tongue extending above the shovel and provided with a longitudinal slot to permit of its having endwise adjustment on the shovel, a bolt passing through the slots of the tongue and shovel and through the stock to hold the parts together, substantially as specified.

In testimony whereof we affix our signatures in presence of two witnesses.

AARON AMOS PEARCE.
  JOSEPH NEWTON BEAVER.

Witnesses:
 JOHN ELLIS DORSEY,
 JOHN HOSEA CALLAWAY.